United States Patent [19]

Nakamura et al.

[11] 4,028,658
[45] June 7, 1977

[54] SAFETY DEVICE FOR AN OIL HYDRAULIC BRAKING SYSTEM

[75] Inventors: Hiroyuki Nakamura, Gotenba; Hiroshi Kawaguchi; Kiyoshi Nishiwaki, both of Susono, all of Japan

[73] Assignee: Toyota Jidosha Kogyo Kabushiki Kaisha, Toyota, Japan

[22] Filed: Mar. 22, 1974

[21] Appl. No.: 453,953

[30] Foreign Application Priority Data

Nov. 13, 1973 Japan .......................... 48-127454

[52] U.S. Cl. ........................ 303/6 C; 188/349
[51] Int. Cl.² ......................................... B60T 8/26
[58] Field of Search ............... 303/6 C, 84 A, 84 R; 188/349, 345, 151 A; 340/52 C; 200/82 D; 137/625.29, 625.36

[56] References Cited

UNITED STATES PATENTS

| | | |
|---|---|---|
| 3,448,230 | 6/1969 | Bueler .............................. 303/6 C |
| 3,463,554 | 8/1969 | Bueler .............................. 303/6 C |
| 3,661,426 | 5/1972 | Tam ................................. 303/6 C |
| 3,697,138 | 10/1972 | Marting ......................... 188/349 X |
| 3,698,771 | 10/1972 | Keady .............................. 303/6 C |
| 3,754,792 | 8/1973 | Ishigami ........................... 303/6 C |
| 3,781,063 | 12/1973 | Valpreda ........................... 303/6 C |
| 3,817,584 | 6/1974 | Huston et al. ................... 188/349 X |

Primary Examiner—Trygve M. Blix
Assistant Examiner—Douglas C. Butler
Attorney, Agent, or Firm—Birch, Stewart, Kolasch and Birch

[57] ABSTRACT

A safety device for an oil hydraulic braking system of a dual-type including separate oil hydraulic systems for the front and rear wheels, the oil hydraulic system being applied with a so-called proportioning element, the safety device being adapted to detect any hydraulic failure which has occurred in any portion of the entire oil hydraulic system and warn the driver of the failure due to a displacement of a single piston member from its normal neutral operating position.

5 Claims, 3 Drawing Figures

DETAIL OF PART "A"

SAFETY DEVICE FOR AN OIL HYDRAULIC BRAKING SYSTEM

BACKGROUND OF THE INVENTION

1. Field of the Invention

This invention relates to a safety device for an oil hydraulic braking system particularly of an automobile.

2. Description of the Prior Art

Generally, in the braking system of an automobile, in view of the running stability at the time of braking, it is provided that the oil hydraulic pressure supplied to the rear wheel cylinder is a little lower than that supplied to the front wheel cylinder when the brake is operated by an oil hydraulic pressure higher than a predetermined level. Thus, the braking force applied to the rear wheels is somewhat weaker than that applied to the front wheels. Such a function of lowering the braking force applied to the rear wheels as compared with that applied to the front wheels at a predetermined ratio is generally called "proportioning." This is effected by supplying the oil hydraulic pressure delivered from a master cylinder of the brake, especially a rear master cylinder in the case of a dual-type oil hydraulic braking system, including independent oil hydraulic circuits for the front and rear wheels, to the rear wheel cylinder through a pressure reducing element called a proportioning valve. Thus, the oil hydraulic pressure in the master cylinder is transmitted to the rear wheel cylinder in a reduced increasing rate when the oil hydraulic pressure in the master cylinder is above a predetermined level. However, in the case of the dual circuit oil hydraulic braking system, it is desirable, that if the front brake fails to operate due to a mishap caused in the oil hydraulic circuit for the front wheel, the rear brake operates with a much larger operating force to compensate for the failure of the front brake. Therefore, it is adverse to such a requirement that the oil hydraulic pressure supplied from the rear master cylinder to the rear wheel cylinder is specifically reduced by the proportioning valve in the situation where the front brake oil hydraulic circuit has failed. Therefore, it is desirable that the proportioning valve is adapted to be selectively by-passed so that the oil hydraulic pressure delivered from the rear master cylinder is directly supplied to the rear wheel cylinder when the front brake fails to operate due to a mishap caused in the oil hydraulic circuit for the front brake.

With regard to the dual-type oil hydraulic circuit including individual oil hydraulic circuits for the front and rear wheels, it is very desirable, with a view toward preventing accidents that a failure in either of the oil hydraulic circuits for the front or rear wheel is detected and the driver is pre-warned by a proper warning means before said failure is actually noticed by the driver because of a distinct deterioration of the performance of the automobile at the time of braking. Of course, it is also desirable that a malfunction of the proportioning valve is detected by a proper detecting means and the driver appropriately warned before the malfunction manifests itself as a change in the automobile running performance at the time of braking.

To meet with the aforementioned requirements, a control valve as disclosed in U.S. Pat. No. 3,448,230 has been proposed. In said U.S. patent, a piston valve including a floating piston valve member is provided, wherein the oil hydraulic pressure delivered from the front master cylinder and that delivered from the rear master cylinder are supplied to first and second ports provided at opposite end regions of the piston valve member to be applied at opposite ends thereof so that the two oil hydraulic pressures balance with each other when the front and rear master cylinders are operating normally, thereby holding the piston valve member at its neutral position. Adjacent said second port where the oil hydraulic pressure from the rear master cylinder is supplied, there is provided a third port which communicates with a rear wheel cylinder and is normally isolated from said second port by an end land portion of the piston member, so that in a normal operating condition, the third port is supplied with an oil hydraulic pressure which is a modification of the oil hydraulic pressure from the rear master cylinder, said modification being effected by a proportioning valve. In this valve structure, if the oil hydraulic pressure from the front master cylinder has failed, the piston valve member is displaced toward said first port due to an unbalance of the pressures applied at opposite ends thereof, whereby said third port communicates directly to said second port due to the displacement of said end land portion, and thus, the oil hydraulic pressure delivered from the rear master cylinder is directly supplied to the rear wheel cylinder while bypassing the proportioning valve. However, in this valve structure, since the piston valve member is adapted to be maintained in its neutral position depending upon a direct balance between the oil hydraulic pressures delivered from the front and rear master cylinders, the positioning of the piston valve member is relatively unstable and tends to readily fluctuate due to a slight unbalance between the two pressures or due to a time delay in the pressure generation. A fluctuation or unstable positioning of the piston valve member might cause a malfunction of the oil hydraulic braking system. If it is desired to overcome this instability by the use of spring means acting at opposite ends of the piston member, as is intended in the valve disclosed in the U.S. Pat. No. 3,448,230, the sensitivity or the accuracy of the operation will be substantially sacrificed. Furthermore, in the case of the valve structure as shown in said U.S. patent, the oil hydraulic pressures delivered from the front and rear master cylinders must be strictly of the same level and performance or, in other words, the front and rear master cylinders must be of substantially the same structure and performance because if such a condition is not satisfied, a stable neutral positioning of the piston valve member cannot be guaranteed.

The control valve disclosed in the aforementioned U.S. patent incorporates a warning means which dispatches a warning signal when the piston valve member has been displaced from its neutral position in either direction due to an unbalance between the oil hydraulic pressures at opposite ends thereof or the pressures delivered from the front and rear master cylinders. A warning signal is thereby produced if a pressure fall occurs in either one of the oil hydraulic circuits of the front and rear brake systems or, more precisely, either one of the oil pressure lines connecting the front and rear master cylinders to said first and second ports, respectively. However, in the valve structure disclosed in the aforementioned U.S. patent, a warning signal is not available if an abnormal pressure drop occurs in the oil hydraulic line leading from the proportioning valve to the rear wheel cylinder, since such a pressure drop does not produce any force to displace the piston valve member in either direction. Furthermore, in said prior structure, a warning signal is not available even when the proportioning valve has become defective, because as previously mentioned, any change in the oil hydraulic pressure applied to said third port does not act to displace the piston valve member in either direction.

SUMMARY OF THE INVENTION

Therefore it is the primary object of this invention to provide an improved safety device for use with a dual-type oil hydraulic braking system wherein individual oil hydraulic circuits are provided for the front and rear wheels and the supply of oil hydraulic pressure to the rear wheel cylinder is made through the proportioning valve, said device being adapted to introduce the oil hydraulic pressure delivered from the rear master cylinder directly to the rear wheel cylinder by bypassing the proportioning valve when the oil hydraulic circuit for the front wheel has failed thereby increasing the braking action for the rear wheel, and to warn the driver when a malfunction has occured in either one of the oil hydraulic circuits for the front and rear wheels or the proportioning valve so that a proper counteraction can be taken by the driver in an early stage of any malfunction of the overall oil hydraulic braking system.

Another object of this invention is to provide such a safety device in a compact structure which includes the control valve structure as well as the proportioning valve as a unitary structure.

According to this invention, the safety device for an oil hydraulic braking system comprises; a piston, said piston having a first effective pressure receiving surface which is exposed to a first port communicating with a front master cylinder and adapted to exert a force in a first direction by the oil hydraulic pressure of the front master cylinder, a second effective pressure receiving surface which is exposed to a second port communicating with a rear wheel cylinder and adapted to exert a force in a second direction opposite to said first direction by the oil hydraulic pressure of the rear wheel cylinder, a land portion adapted to open said second port toward a third port communicating with a rear master cylinder when said piston has been displaced in said second direction, and a cam portion adapted to actuate an electric contact with said piston has been displaced in either direction; a spring adapted to exert a force to said piston in said first direction, said force being not lower than the balance between said second mentioned force acting onto said second pressure receiving surface and said first mentioned force acting onto said first pressure receiving surface; and a proportioning means adapted to transmit the oil hydraulic pressure in said third port to said second port with a reduced increasing rate when said pressure is above a predetermined level.

In the aforementioned structure according to this invention, the piston can be held stably in its neutral position regardless of small fluctuations of the oil hydraulic pressure in either of the oil hydraulic circuits for the front and rear wheel braking systems and, in this case, it is not necessarily required that the oil hydraulic pressures delivered from the front and rear master cylinders are of the same level and performance. Furthermore, since the oil hydraulic pressure in the line leading from the proportioning valve to the rear wheel cylinder is compared with the oil hydraulic pressure in the front brake circuit to cause displacement of the piston valve member and to produce a warning signal when an abnormal pressure drop has occurred in either of the oil hydraulic circuits of the front and rear brake systems, a malfunction of the proportioning valve such as a blocking thereof is also detected by the displacement of the piston valve member to produce a warning signal. By employing the oil hydraulic pressure existing in the line leading from the exit of the proportioning valve to the rear wheel cylinder as one pressure value to position the piston valve member, any failure of pressure which occurs in either the upstream or downstream side of the proportioning valve as seen from the rear master cylinder is certainly sensed by the piston valve member as a displacement thereof from its neutral position. By contrast with the structure of the aforementioned prior art, since the piston valve member in the structure according to this invention is not maintained in its neutral position by the direct balance of the oil hydraulic pressures of the front and rear master cylinders both being applied at opposite full end areas of the piston member, it is not necessary that the front and rear master cylinders have the same oil hydraulic level and performance.

BRIEF DESCRIPTION OF THE DRAWING

In the accompanying drawing.

DESCRIPTION OF THE PREFERRED EMBODIMENT

In the following, this invention will be described in more detail with respect to a preferred embodiment and with reference to the accompanying drawing.

Figure 1:
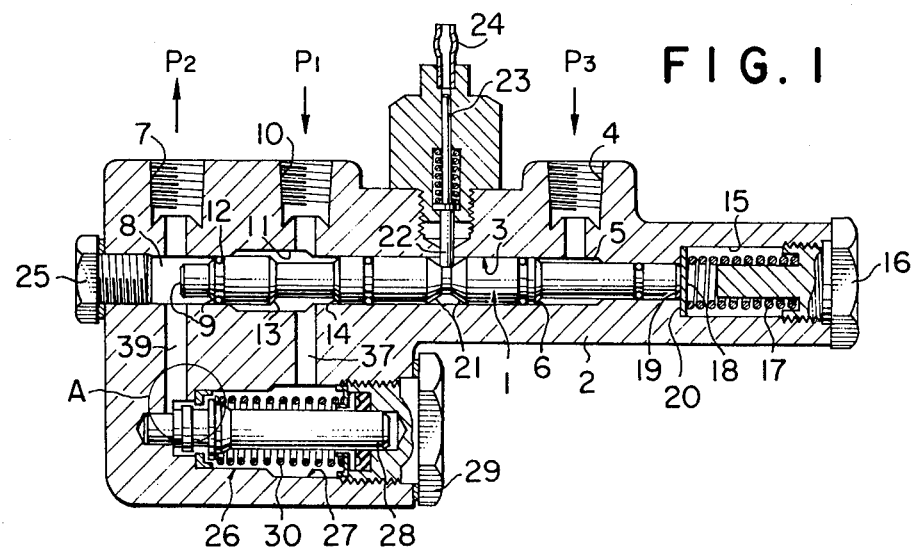
FIG. 1 is a longitudinal section of an embodiment of the safety device for an oil hydraulic braking system according to this invention.

Referring to FIG. 1, reference numeral 1 designates a piston made of an unitary body and formed with various pressure receiving surfaces, valve and land portions and cam portions, which operate in the manner described hereinunder. The piston 1 is received in a corresponding bore 3 formed in a housing 2 so as to be movable in opposite directions. A part of said bore 3 is formed with a port 5 adapted to communicate with a front master cylinder (not shown) by way of a connecting port 4. Corresponding to said port 5, the piston 1 is formed with an effective pressure receiving surface 6 which is applied with a force acting in the leftward direction as seen in FIG. 1 by the oil hydraulic pressure delivered from the front master cylinder. Another part of the bore 3 defines a port 8 adapted to communicate with a rear wheel cylinder (not shown) by way of a connecting port 7, and corresponding to the port 8, the piston 1 is provided with an effective pressure receiving surface 9 which is applied with a force acting in the rightward direction as seen in FIG. 1 by the oil hydraulic pressure in the rear wheel cylinder. Furthermore, the bore 3 is formed with a third port 11 adapted to communicate with a rear master cylinder (not shown) by way of a connection port 10, said port 11 being isolated from the port 8 by a valve or land portion 12 of the piston 1. In this connection, it should be noted that, although the piston 1 has two pressure receiving surfaces 13 and 14, both facing the port 11, the forces applied to these pressure receiving surfaces by the oil hydraulic pressure in the rear master cylinder are always equivalent and opposite in direction, whereby said forces produce no component which drives the piston in either direction therealong. A right end portion of the bore 3 is formed as a spring housing 15 adapted to house a compression spring 17 which is supported at its right end by a screw member 16 and exerts a spring force onto a right end 19 of the piston 1 by way of a plate 18 at its left end. However the plate 18 abuts onto a seat portion 20 unless the piston 1 projects rightward as seen in FIG. 1 from the position shown in FIG. 1, and therefore, the spring 17 does not apply a compression force to the piston 1 beyond the position shown in FIG. 1. The piston 1 is formed with cam portions 21 at its central portion, the cam portions being adapted to push up a cam follower element 22 as seen in FIG. 1 if the piston 1 has been displaced in either of the leftward or rightward directions as seen in FIG. 1 from the position shown in FIG. 1. If the cam follower element 22 is pushed up, its tip portion 23 contacts with electric terminal elements 24 and closes an electrical warning circuit, not shown in the drawing. 25 is a screw member which closes the left end of the bore 3.

Figure 2:
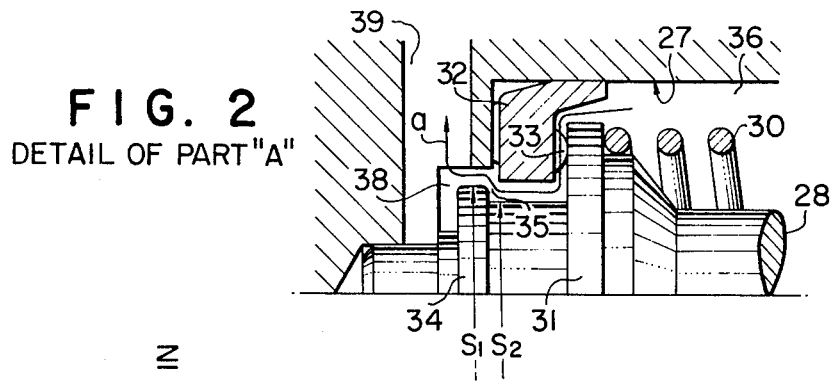
FIG. 2 is a partial view showing part "A" in FIG. 1 on an enlarged scale.

The housing 2 further incorporates a proportioning valve generally designated by reference numeral 26. The proportioning valve comprises a bore 27 formed in the housing 2 and a piston 28 mounted in said bore, said piston being applied with a spring force acting in the leftward direction as seen in FIG. 1 by a compression coil spring 30 which is supported at its one end by a screw member 29 which closes an open end of said bore 27. The essential structure for the function of the proportioning valve 26 is incorporated in portion "A" shown in FIG. 1, which is shown in more detail in FIG. 2. As shown better in FIG. 2, the piston 28 has a flange portion 31 which receives the other end of the coil spring 30 on one side thereof and abuts onto a plurality of spherical projections 33 provided as spaced along a peripheral portion of a ring element 32. The piston 28 has another flange portion 34 which co-operates with the ring element 32 to define an annular fluid constricting passage 35 which is reduced in its opening area as the piston 28 moves rightward as seen in FIG. 2. A space 36 in the bore 27 positioned at the right side of the constricting passage 35 communicates with the port 11 of the bore 3 by way of a passage 37, and accordingly, the space 36 is supplied with the oil hydraulic pressure from the rear master cylinder. On the other hand, a space 38 in the bore 27 located at the left side of the constricting passage 35 communicates with the port 8 of the bore 3 by way of a passage 39 and, accordingly, the oil hydraulic pressure which is reduced by passing through the constricting opening 35 is transmitted to the rear wheel cylinder.

The safety device for the oil hydraulic braking system as described above operates as follows;

Before explaining the operation of the entire safety device, the operation of the proportioning valve 26 will be first explained. As a result of the actuation of the brake, the oil which has been supplied into the space 36 from the rear master cylinder through the connecting port 10, port 11 and passage 37 flows through the constricting passage 35 in the direction shown by arrow $a$ while being applied with a throttling action and is sent toward the rear wheel cylinder through the passage 39, port 8 and connecting port 7. Assuming that the oil hydraulic pressure generated by the rear master cylinder is P1 and the oil hydraulic pressure supplied to the rear wheel cylinder is P2, the piston 28 applies a force F which is expressed by $$F = S1\ P2 - (S1 - S2)\ P1$$

due to the effective pressure receiving surfaces S1 and (S1 − S2) provided at opposite sides of the flange 34, said force F acting rightward as seen in FIG. 2. In this case, if the braking action is moderate and the oil hydraulic pressure P1 generated in the rear master cylinder as well as the oil hydraulic pressure P2 applied to the rear wheel cylinder based upon the oil hydraulic pressure of the rear master cylinder are both low, the force F is also relatively low so that the compression coil spring 30 designed to have a proper strength overcomes the force F, whereby in this condition the piston 28 is kept at a position where the flange portion 31 abuts onto the spherical projections 33 of the ring element 32. In this condition, the throttle opening 35 is fully opened and the pressure drop caused in the flow of oil passing through the throttle opening is substantially zero, thus making the oil hydraulic pressure P2 to be substantially equal to the oil hydraulic pressure P1. However, if the brake is actuated strongly and the oil hydraulic pressure P1 generated by the rear master cylinder exceeds a predetermined level, the aforementioned force F is increased so high that it overcomes the spring force of the compression coil spring 30 and displaces the piston 28 rightward from the position shown in FIG. 2. The balance of the forces in this condition is expressed by the following equation;

$$S1\ P2 = (S1-S2)\ P1 + FS$$

wherein FS is the spring force of the spring 30. Therefore $$P2 = S1 - S2/S1\ P1 + FS/S1\ (S1 - S2/S1) < 1)$$

Figure 3:
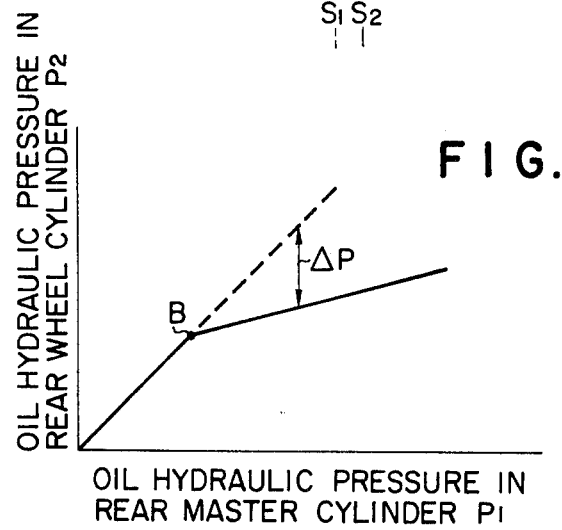
FIG. 3 is a graph showing the relation between the rear master cylinder oil hydraulic pressure P1 and the rear wheel cylinder oil hydraulic pressure P2.

The increasing rate of pressure P2 is reduced as compared with the increasing rate of pressure P1. Such a relation between pressures P1 and P2 effected by the proportioning valve 26 is shown in FIG. 3, wherein point B at which the proportioning line turns is called the turning point which is one of the important quantities of the design of a brake system.

When the proportioning valve 26 is operating normally in the aforementioned manner, the balance between the force to urge the piston 1 rightward due to the oil hydraulic pressure P2 acting onto the pressure receiving surface 9 and the force to urge the piston leftward due to the oil hydraulic pressure P3 acting onto the pressure receiving surface 6 (P3 ≈ P1 in the normal operation) is overcome by the spring force of the compression coil spring 17 which is so designed. Therefore, the piston 1 is held at its neutral position as shown in FIG. 1. In this condition, the port 8 is isolated from the port 11 by the valve land portion 12, and the electric contact 24 is opened. By contrast to this normal operating condition, if the proportioning valve 26 becomes defective so that its normal pressure reducing operation is lost, the oil hydraulic pressure P2 will rise up to P1, whereby the piston 1 will be applied with an excess force corresponding to the product of the pressure receiving surface 9 and ΔP in FIG. 3, said excess force acting rightward as seen in FIG. 1 to drive, as a result, the piston 1 rightward, whereby one of the cam portions 21 of the piston pushes up the cam follower element 22 which in turn closes the electric contacts 24 at its upper end portion 23 thereby actuating the warning circuit to produce a warning signal.

On the contrary, if the oil hydraulic pressure P2 is abnormally reduced due to a blocking of the proportioning valve 26 or a leakage in the oil hydraulic system for the rear wheel cylinder, an unbalance between the oil hydraulic pressure P2 acting onto the pressure receiving surface 9 and the oil hydraulic pressure P3 acting onto the pressure receiving surface 6 is produced, whereby the piston 1 is driven leftward as seen in FIG. 1, thereby closing the electric contacts 24 by the other side of the cam portions 21 and actuating a warning signal. Such a leftward movement of the piston 1 also occurs if a leakage has been caused in the oil hydraulic system leading from the rear master cylinder to the proportioning valve because, in this case, the pressure P1 lowers abnormally and inevitably the oil hydraulic pressure in the port 8 lowers abnormally as compared with the pressure P3.

If the oil hydraulic pressure in the front wheel oil hydraulic system fails due to a leakage, the pressure P3 acting in the port 5 lowers, whereby the force acting onto the pressure receiving surface 6 is lost. Thus, the piston 1 is moved in the rightward direction by the force due to the oil hydraulic pressure P2 acting onto the pressure receiving surface 9, whereby the cam portion 21 pushes the cam follower 22 which closes the electric contacts 24 to actuate a warning signal. Furthermore, the valve land portion 12 of the piston 1 is drawn out into the port 11 due to the rightward movement of the piston, whereby the port 8 communicates directly with the port 11. Thus, the oil hydraulic pressure P1 generated in the rear master cylinder is transmitted directly to the rear wheel cylinder while bypassing the proportioning valve 26, whereby the braking force of the rear wheel is increased to cover the failure of the front wheel brake.

From the foregoing, it will be appreciated that the safety device according to this invention can detect any hydraulic failure in the entire system of the dual-type oil hydraulic braking system to actuate a warning signal and to cover the front wheel brake by automatically isolating the proportioning valve for the rear wheel brake when the front wheel brake has failed.

We claim:

1. A safety device for an oil hydraulic brake system comprising a housing containing a first bore and a second bore, first, second and third ports opening into said first bore, said first, second and third ports being connected to a front master clinder, and said second and third ports communicating with said second bore through passages formed in said housing, a rear wheel cylinder and a rear master cylinder, respectively, a piston slidably disposed in said first bore, said piston having a first effective pressure-receiving surface of a first area communicating with said first port, said first surface being adapted to receive a first force exerted by the oil hydraulic pressure of the front master cylinder in a first direction, a second effective pressure-receiving surface having a second area larger than said first area and communicating with said second port, said second surface being adapted to receive a second force exerted by the oil hydraulic pressure of the rear wheel cylinder in a second direction opposite to said first direction, a land portion adapted to provide communication between said second port and said third port when said piston is displaced in said second direction, a cam portion adapted to actuate an electrical contact when said piston has been displaced in either direction, a spring adapted to exert a force to said piston in said first direction within a limited stroke, said force being not less than the balance between said second and first forces, and a proportioning means disposed in said second bore and communicating with the rear master cylinder and the rear wheel cylinder through the passages formed in said housing and said second and third ports, said proportioning means adapted to transmit hydraulic pressure of the rear master cylinder to the rear wheel cylinder with a reduced increasing rate when the hydraulic pressure of the rear master cylinder is above a predetermined level.

2. The safety device according to claim 1, wherein said piston is substantially made of portions of two different diameters, a larger diameter portion providing said second effective pressure-receiving surface and said land portion and a smaller diameter portion which cooperates with the larger diameter portion to provide said first effective pressure-receiving surface as a balance therebetween and a portion of said piston communicating with said spring and adapted to receive the force exerted by said spring.

3. The safety device of claim 1, wherein the housing is provided with a ring element and the proportioning means comprises a piston element provided with a spring means, said spring means cooperating with said ring element to define an annular fluid passageway which is maintained constant by the movement of said piston element in one direction and adapted to be reduced in its opening area by the movement of the piston element in the opposite direction.

4. The safety device according to claim 1, further including a cam follower element in sliding contact with said cam portion, said cam follower element being adapted to engage electrical contacts thereby actuating a warning signal.

5. A safety device of claim 4, wherein the cam portion is an area of gradually reducing diameter of the piston from opposite directions, the cam follower being in sliding engagement with said cam portion so that any movement of the piston in either direction will be transmitted to the cam follower and, in turn, to the electrical contacts.

* * * * *